(12) United States Patent
Westberg et al.

(10) Patent No.: US 8,649,378 B2
(45) Date of Patent: Feb. 11, 2014

(54) METHOD AND APPARATUS FOR CONTROLLING THE ROUTING OF DATA PACKETS

(75) Inventors: Lars Westberg, Enkoping (SE); Andras Csaszar, Budapest (HU); Mats Naslund, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 350 days.

(21) Appl. No.: 12/993,674

(22) PCT Filed: May 22, 2008

(86) PCT No.: PCT/SE2008/050599
§ 371 (c)(1),
(2), (4) Date: Nov. 19, 2010

(87) PCT Pub. No.: WO2009/142561
PCT Pub. Date: Nov. 26, 2009

(65) Prior Publication Data
US 2011/0064085 A1    Mar. 17, 2011

(51) Int. Cl.
*H04L 12/28* (2006.01)
*H04L 12/56* (2011.01)

(52) U.S. Cl.
USPC .......................................... 370/392

(58) Field of Classification Search
None
See application file for complete search history.

(56) References Cited

U.S. PATENT DOCUMENTS

| | | | |
|---|---|---|---|
| 6,925,507 B1 * | 8/2005 | Hersent | 710/52 |
| 7,406,709 B2 * | 7/2008 | Maher et al. | 726/12 |
| 7,734,172 B2 * | 6/2010 | Tse-Au | 398/9 |
| 8,181,014 B2 * | 5/2012 | Csaszar et al. | 713/153 |
| 2004/0098485 A1 | 5/2004 | Larson et al. | |
| 2005/0132060 A1 | 6/2005 | Mo et al. | |
| 2010/0250930 A1 * | 9/2010 | Csaszar et al. | 713/168 |

FOREIGN PATENT DOCUMENTS

| WO | 2007/035655 A2 | 3/2007 |
|---|---|---|
| WO | 2008/147302 A1 | 12/2008 |

* cited by examiner

*Primary Examiner* — Ayaz Sheikh
*Assistant Examiner* — Blanche Wong
(74) *Attorney, Agent, or Firm* — Coats and Bennett PLLC

(57) ABSTRACT

Method and apparatus for controlling the routing of data packets in an IP network (200). A DNS system (202) stores a packet admission policy configured for a first end-host (B) that dictates conditions for allowing other end-hosts to get across data packets to the first end-host or not. A routing voucher is defined which is required for routing data packets to the first end-host. The routing voucher is distributed to routers (R) in the IP network. When an address query is received at the DNS system (202) from a second end-host, the voucher is supplied to the second end-host if the configured policy allows the second end-host to convey data packets. Otherwise, the voucher is not supplied. If allowed, the second end-host will add the routing voucher to any data packets directed to the first end-host. When a valid routing voucher is present in a packet at a router (204) in the network, the packet will be forwarded to the next router in the IP network. The router will otherwise discard the packet.

19 Claims, 3 Drawing Sheets

METHOD AND APPARATUS FOR CONTROLLING THE ROUTING OF DATA PACKETS

TECHNICAL FIELD

The present invention relates generally to a method and apparatus for controlling the routing of data packets in a public IP network such as the Internet.

BACKGROUND

Packet-based transmission of digitally encoded information between different parties over IP (Internet Protocol) networks is used for a variety of communication services, such as e-mail messaging, Internet browsing, voice and video telephony, content streaming, games, and so forth. Digitally encoded information is arranged into data packets at a sending party, which are then transmitted towards a targeted receiving party over a transmission path. The transmission path between the sending party and the receiving party may include various networks, switches, gateways, routers and interfaces. The communicating parties are often referred to as "end-hosts" which may be any type of equipment capable of packet-based IP communication, such as fixed and mobile telephones, computers, servers, game stations, etc. In this description, the term end-host will generally represent any such communication equipment.

An end-host connected to the Internet has typically been assigned a forwarding identity in the form of an IP address needed for routing any data packets directed to that end-host along the transmission path. Typically, the end-host has also been assigned a more or less intelligible name in a text string, e.g. a conventional e-mail address or web address, such as user@operator.com, which is associated with the assigned IP address. A DNS (Domain Name Server) system comprising a hierarchy of DNS servers is used for retrieving the current IP address of a particular host name. Thus, an end-host can query the DNS system with a host name to communicate with, and the DNS will then reply by providing the current IP address of the corresponding end-host. This type of query is sometimes referred to as a destination query, identity query or address query, the latter being used in throughout this description.

Data packets are basically configured with a data field containing payload data and a header field in which the sending end-host inserts the destination address of the target end-host, i.e. the IP address obtained from the DNS system. Thus, each data packet is routed over multiple network nodes, generally referred to as IP routers, along the transmission path based on the destination address in the packet's header field.

In addition to simply receiving and forwarding data packets, an IP router may also be capable of other functions such as security control, packet scheduling, and translation of addresses and protocols. Further, end-hosts may have a firewall functionality for determining whether incoming data packets should be admitted or discarded, e.g. according to settings made by the user.

Each router in an IP network typically comprises ingress and egress units acting as interfaces for receiving and sending data packets, respectively. The router also comprises a routing or forwarding function for determining which router an incoming data packet should be sent to as a "next hop", based on a forwarding table defined in the router. As is well-known in this field, a data packet can often be routed along multiple alternative paths depending on the network topology and the current traffic load.

Links to the nearest neighbouring routers are provided in each router by means of corresponding ports, and a forwarding architecture is also configured in the routers based on the distribution of topology information and link information. Each port can have an IP address and an IP mask configured and routing protocols are used to distribute this information among the routers in the network in a configuring procedure. From the distributed topology information, each router then calculates its own forwarding table, containing multiple destination IP-addresses and associated outgoing ports. As each incoming data packet has a destination IP-address in its header, the forwarding table is used to find the suitable entry in the forwarding table from that IP-address. The main function of the forwarding table is thus to determine the appropriate outgoing port for each incoming packet.

In FIG. 1, the basic structure of a conventional IP router 100 is shown, when situated in an IP network. Among other things, IP router 100 comprises an ingress part 100a, an egress part 100b and a forwarding function here schematically represented by a forwarding table 100c. The egress part 100b comprises a plurality of outgoing ports $P_A$, $P_B$, $P_C$, ... leading to different neighbouring routers A, B, C, ..., respectively, to which router 100 is directly connected. An incoming data packet 102 has a payload field PL and a header H, the latter containing the destination address for the packet.

The forwarding table 100c is comprised of multiple entries each containing an IP mask, an IP address and an outgoing port number. The IP mask may be defined in terms of a hexadecimal encoded string such as, e.g., FF.FF.FF.0, or FF.FF.8.0, etc. Briefly described, the destination address in header H is compared with the entries in forwarding table 100c by applying a logic "AND"-operation to the destination address and the IP mask, in order to detect a matching entry with the same IP address. Once a matching entry is found, the packet can be sent out on the outgoing port according to the port number of that entry.

The incoming data packet 102, which may have been forwarded from a previous router (not shown) to router 100, is thus first received at the ingress unit 100a. It is then determined which next router the packet should be sent to, based on the destination address in header H and using the forwarding table 100c. In this example, the incoming packet 102 has a destination IP address that, when combined with the mask, matches the IP address of an entry in forwarding table 100c having port number $P_C$. The packet 102 is therefore sent out on the corresponding port which is connected to router C.

However, a major problem in IP-networks and the Internet is that the security support is generally insufficient, as explained below. The current routing architecture and protocols were originally designed for a "friendly" environment, i.e. assuming that there are no "illicit" or "corrupt" users communicating in IP networks. Nevertheless, various security solutions have been added to the IP architecture in order to protect the communicated data, such as IP-sec on a low layer and also TLS (Transport Layer Security) on a higher layer. Further, MPLS (Multiprotocol Label Switching) is a solution for building Layer 3 VPNs (Virtual Private Networks) to ensure secure communication. In the VPN case when an intranet is used, private addressing is required and the network is somewhat isolated from the public Internet such that external un-authorized hosts are not allowed to reach and communicate with the hosts attached to the intranet.

Other prior solutions for providing security in the routing protocol include: secure communication between routers such that no illicit entity can eavesdrop, manipulate or imitate a router, the establishment of IP-sec tunnels between router ports to protect the transport of packets between routers, and link security on the layer 2. Various authentication procedures and cryptographic keys can also be used, e.g. according to DNSSec (DNS Security), HIP (Host Identity Protocol) and CGA (Cryptographically Generated Addresses), to enhance the security. While protection against unwanted traffic is used for certain applications (e.g. spam filtering for e-mails), no basic protection against violating end-hosts and unwanted data packets has been generally provided in the public IP infrastructure, though.

Since the internal forwarding identities, i.e. IP addresses, are publicly distributed end-to-end in the manner described above, any end-host is basically able to send messages and data packets to any other end-host over the Internet, resulting in the well-known problems of flooding, spamming, virus, fraud and so-called "Denial-of-service" threats. Hence, it is generally a problem that any end-host can get across data packets totally out of control of the receiving end-host, and that public IP networks such as the Internet have no mechanism in the IP infrastructure for preventing that data packets from potentially illicit or corrupt end-users are routed to the receiver.

More or less complex functionality can be added though at the end-host or in the link layer, such as firewalls or the like, in order to limit the connectivity. However, these solutions are "last line of defence" solutions, meaning that the transport of unwanted data packets can still consume network resources along the entire sender-receiver path, only to be discarded at the receiver.

The paper "Off by default!" by Ballani et al, 4th ACM Workshop on Hot Topics in Networks HotNets 2005, College Park, Md., November 2005, describes an IP-level protocol by which end-hosts signal, and routers exchange, reachability constraints on different destination prefixes. According to this document, the end-hosts are obliged to configure their reachability in the routers.

SUMMARY

It is an object of the present invention to address at least some of the problems outlined above. It is also an object to obtain a mechanism for controlling the routing of data packets in an IP network in order to avoid unwanted traffic. These objects and others can be achieved primarily by providing methods and apparatuses as defined in the attached independent claims.

According to one aspect, a method is provided for controlling the routing of data packets in an IP network, as performed by a DNS system. In this method, a packet admission policy is stored in the DNS system configured for an associated first end-host. The policy dictates conditions for allowing other end-hosts to get across data packets to the first end-host or not. A routing voucher is defined for the first end-host corresponding to the packet admission policy, the routing voucher or a representation thereof being required in data packets directed to the first end-host for routing the data packets towards the first end-host. The routing voucher or voucher representation is then distributed to at least one router in the IP network.

When an address query is received for the first end-host from a second end-host, the routing voucher or a representation thereof is supplied to the second end-host if the packet admission policy allows the second end-host to convey data packets to the first end-host. Thereby, the second end-host is able to add the routing voucher or voucher representation to any data packets directed to the first end-host for admission through the IP network. On the other hand, the DNS system refrains from supplying the routing voucher or voucher representation to the second end-host if the packet admission policy does not allow the second end-host to convey data packets to the first end-host.

According to another aspect, an apparatus is provided in a DNS system for controlling the routing of data packets in an IP network. The DNS system apparatus comprises a policy storage adapted to store a packet admission policy configured for an associated first end-host, which dictates conditions for allowing end-hosts to get across data packets to the first end-host or not.

The DNS system apparatus further comprises a voucher manager adapted to define a routing voucher for the first end-host corresponding to the packet admission policy, the routing voucher or a representation thereof being required in data packets directed to the first end-host for routing the data packets towards the first end-host. The voucher manager is also adapted to distribute the routing voucher or voucher representation to at least one router in the IP network.

The DNS system apparatus further comprises an address query manager adapted to receive an address query for the first end-host from a second end-host, and to supply the routing voucher or a representation thereof to the second end-host if the packet admission policy allows the second end-host to convey data packets to the first end-host. The address query manager is also adapted to refrain from supplying the routing voucher or voucher representation to the second end-host if the packet admission policy does not allow the second end-host to convey data packets to the first end-host.

Different embodiments are possible in the method and apparatus above of the DNS system. For example, the packet admission policy may dictate any of: which end-hosts are allowed to convey data packets to the first end-host, which end-hosts are not allowed to convey data packets to the first end-host, when data packets are admitted to the first end-host, and that only a limited amount, rate and/or size of data packets is admitted to the first end-host.

The routing voucher may have a limited validity and may be changed or updated according to a predetermined scheme comprising any of: at certain fixed or varying time intervals, after a certain number of address queries, and in dependence of the identity of the second end-host.

The address query manager may be further adapted to provide an instruction to the second end-host to include the voucher or voucher representation whenever sending a data packet to the first end-host.

The first end-host may be notified that the second end-host has been allowed to convey data packets by receiving the routing voucher. Further, the DNS system may send the routing voucher or another associated routing voucher to the first end-host to enable admission of data packets in the opposite direction to the second end-host.

The routing voucher may further be associated with one or more IMS gateways in an IMS network, and the routing voucher may then be required in requests for IMS services.

According to yet another aspect, a method is provided for controlling the routing of data packets in an IP network, as performed by a router in the IP network. In this method, a voucher list is maintained including a received routing voucher defined for a first end-host which is required in data packets directed to the first end-host for routing the data packets in the IP network. The routing voucher corresponds to a packet admission policy configured in a DNS system for the first end-host, which dictates conditions for allowing other end-hosts to get across data packets to the first end-host or not.

When a data packet is received from a second end-host directed to the first end-host, it is determined whether the received data packet contains a valid routing voucher or a representation thereof that can be verified by checking the voucher list. The received data packet is forwarded towards its destination if it contains such a valid routing voucher or voucher representation, and the packet is discarded if it does not contain such a valid routing voucher or voucher representation.

According to yet another aspect, an apparatus is provided in a router for controlling the routing of data packets in an IP network. The router apparatus comprises a voucher storage with a voucher list including a received routing voucher defined for a first end-host which is required in data packets directed to the first end-host for routing the data packets in the IP network. The routing voucher corresponds to a packet admission policy configured in a DNS system for the first end-host, which dictates conditions for allowing other end-hosts to get across data packets to the first end-host or not. The router apparatus also comprises an ingress part for receiving a data packet from a second end-host directed to the first end-host.

The router apparatus further comprises a routing controller adapted to determine whether the received data packet contains a valid routing voucher or a representation thereof that can be verified by checking the voucher list. The routing controller is also adapted to forward the received data packet towards its destination if it contains such a valid routing voucher or voucher representation, and to discard the packet if it does not contain such a valid routing voucher or voucher representation. The router apparatus also comprises an egress part for sending the data packet towards its destination if admitted.

Different embodiments are possible in the router method and apparatus above. For example, the voucher storage may obtain the routing voucher or voucher representation from the DNS system or from another router in a voucher propagation procedure. Further, the next hop may be determined by means of a forwarding table, if the data packet can be admitted.

Further possible features and benefits of the present invention will become apparent from the detailed description below.

BRIEF DESCRIPTION OF THE DRAWINGS

The present invention will now be described in more detail by means of exemplary embodiments and with reference to the accompanying drawings, in which.

DETAILED DESCRIPTION

Figure 1:
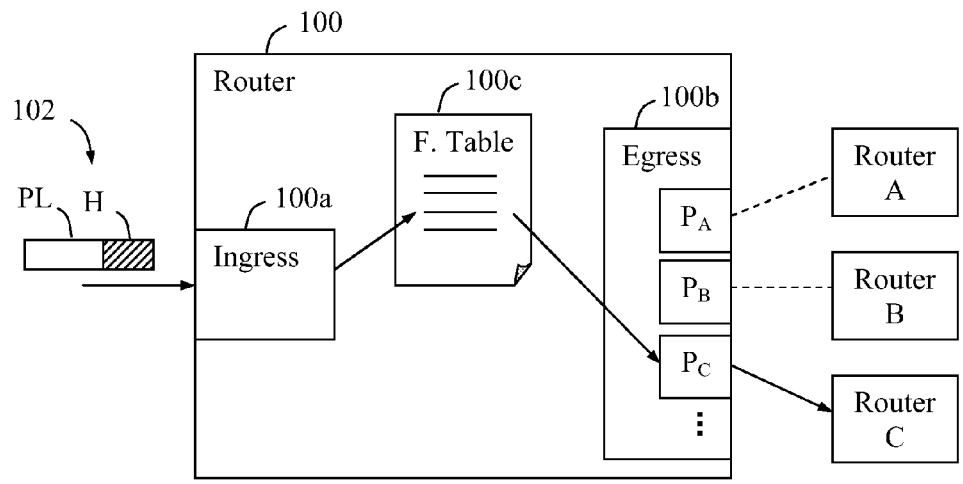
FIG. 1 is a schematic block diagram illustrating a conventional router in an IP network, according to the prior art.

Embodiments herein utilize an existing DNS system for defining and administrating a routing voucher of an end-host based on a packet admission policy configured for that end-host. The routing voucher is distributed among IP routers in the IP network and may also be supplied to entities authorized to send data packets to the end-host. The routing voucher will basically provide admission through the network for data packets directed to the associated end-host, in a manner to be described in more detail below.

The packet admission policy of an associated end-host may be comprised of a set of rules and/or parameters or the like that dictate the conditions for allowing end-hosts to get across data packets to the associated end-host. For example, the packet admission policy may dictate which end-hosts are allowed to convey data packets, which end-hosts are not allowed to convey data packets, and/or when data packets can be admitted to the associated end-host. The packet admission policy may further dictate that only a limited data amount, data rate and/or packet size is permitted to the associated end-host, and so forth.

When an end-host sends an address query, or identity query, to the DNS system for a target end-host in order to communicate with the target end-host, the DNS system will check the policy of the target end-host to determine whether data packets from the querying end-host can be admitted through the IP network. If so, the DNS system replies by supplying the IP address as well as the routing voucher of the target end-host to the querying end-host. Alternatively, the routing voucher itself may be arranged to contain embedded routing information that implies the destination address or other routing parameter that can be used for routing data packets towards a destination. In that case, the DNS system supplies the routing voucher only.

The querying end-host can then send data packets containing the routing voucher to the target end-host, and those data packets will be routed in the intermediate IP network based on the routing voucher, effectively being a "certificate" or "credential" for the packet. Naturally, if a targeted end-host does not have a packet admission policy configured in the DNS system, no routing voucher may be required for routing packets to that end-host through the IP network. However, some end-hosts may be subject to a generic or default packet admission policy requiring a valid routing voucher in communicated packets.

Consequently, any data packets directed to a target end-host but lacking a required valid routing voucher, will be stopped and discarded at any router in the network that checks for valid routing vouchers. Thereby, end-hosts connected to the IP network will be able to control from which other end-hosts data packets can be allowed, by setting a packet admission policy in the DNS system and by requiring a valid routing voucher for routing. Even though an unauthorised end-host may manage to attain the IP address of a target end-host from elsewhere than the DNS, the required routing voucher can only be attained from the DNS system and only if the packet admission policy is fulfilled.

Assuming that a data packet cannot be routed through an IP network without a valid routing voucher, a VPN or intranet can basically be accomplished without requiring private addressing, e.g. comprising a group of end-hosts only allowing data packets within the group in their DNS implemented packet admission policies. The policy rules and parameters therein will thus dictate and limit the connectivity by means of a routing voucher, thereby putting limitations on the access to the routing voucher.

The routing voucher can thus be used to "open" or enable the forwarding between the communicating parties, i.e. end-hosts. The routing voucher can be made globally unique and may be a random number or code that should be virtually impossible to guess. Any overlap of created routing vouchers can thus easily be avoided such that no added identities, such a shim header typically needed in the case of overlapping private IP addresses, are required for distinguishing the vouchers.

Figure 2:
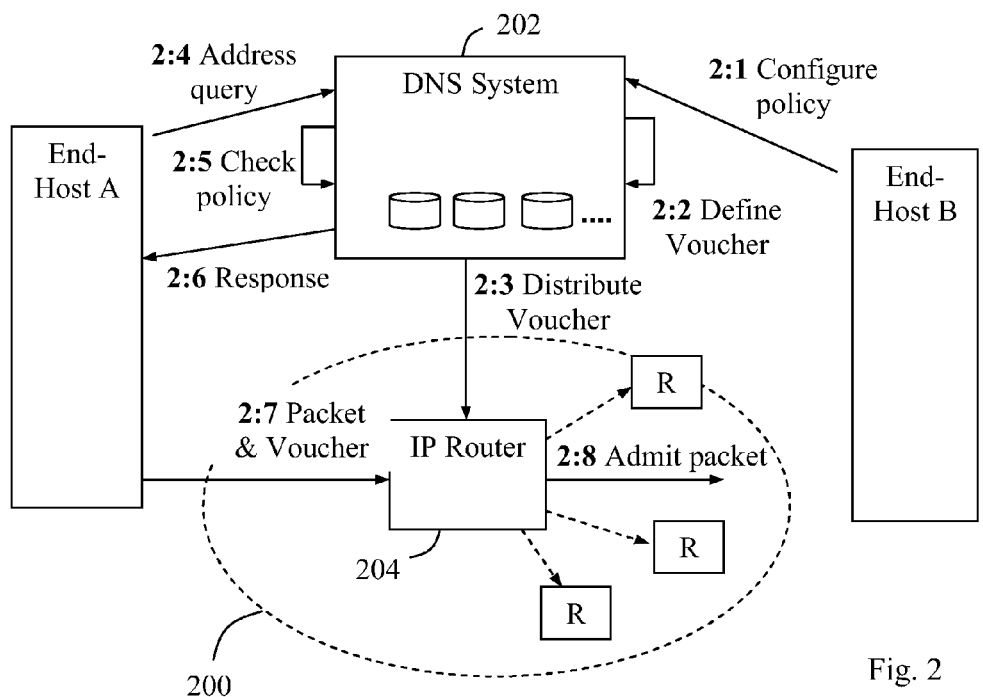
FIG. 2 is a schematic block diagram overview illustrating how the routing of data packets in an IP network can be controlled, according to one embodiment.

FIG. 2 is a block diagram overview illustrating schematically how the routing of a data packet through an IP network 200 from one end-host A directed to another end-host B, can be controlled based on a routing voucher defined for end-host B in a DNS system 202 comprising a hierarchy of DNS servers, as schematically indicated in the figure. This procedure is shown as a series of actions or steps. In a first step 2:1, end-host B initiates the configuring of a packet admission policy in the DNS system 202 that dictates which end-hosts are allowed to convey data packets to end-host B. Alternatively, a network operator may configure the packet admission policy in the DNS system 202 for end-host B in step 2:1. Moreover, a generic or default policy configuration may be used automatically for end-host B such that step 2:1 is basically not required.

DNS system 202 then defines a corresponding routing voucher valid for end-host B, in a next step 2:2, that will be required in data packets directed to end-host B for packet admission through the IP network 200. It is also possible to define multiple routing vouchers for a certain end-host to be supplied to different querying end-hosts, such that each voucher is unique for each querying end-host.

In a following step 2:3, the defined routing voucher, or a representation thereof, is distributed to routers in IP network 200. In this step, DNS system 202 may send the voucher to only one or just a few routers which in turn could propagate the voucher to further routers in the network according to some suitable propagation scheme, which is however not necessary to describe here further to understand the invention. The voucher may also be fetched from DNS system 202 or elsewhere by the routers whenever needed. As indicated above, it is also possible to distribute a suitable representation of the voucher from which the routers can derive the actual routing voucher in a predetermined manner. As a result, in either case, the distributed routing voucher will eventually be stored in a plurality of routers throughout the network 200. In practice, a voucher server or the like associated with the DNS system 202 may be responsible for distributing the voucher in step 2:3, depending on the implementation.

At some point later, end-host A intends to communicate with end-host B and sends an address query for end-host B to the DNS system 202, in a further step 2:4, basically requesting the current destination address of the target end-host B who is identified by a text string or the like, e.g. in the manner of a conventional e-mail address or web address.

In a following step 2:5, DNS system 202 checks the packet admission policy previously configured for end-host B, to determine whether end-host A is allowed to convey data packets to end-host B or not. In this example, end-host A actually fulfils the packet admission policy of end-host B. DNS system 202 can therefore send a response to end-host A, in a next step 2:6, containing the routing voucher defined in step 2:2 and distributed in step 2:3 above, or a representation of that voucher, and possibly also containing the destination address of end-host B if the voucher itself does not include or imply useful routing information. In this step, DNS system 202 may also provide an instruction to include the voucher whenever sending a data packet to end-host B.

End-host A is now able to get across data packets to end-host B over the network 200 by means of the obtained routing voucher or voucher representation. Optionally, DNS system 202 may also notify end-host B that end-host A has received the routing voucher thereby being allowed to convey data packets to B. Thus, end-host A starts the communication and sends a data packet directed to end-host B in a next step 2:7, with the previously obtained routing voucher or voucher representation in the packet's destination field, and possibly also including a destination address if not already contained in the voucher. In the figure, it is assumed that network 200 contains a plurality of routers including the shown router 204 which is present somewhere along the transmission path between end-hosts A and B.

When receiving the data packet issued by end-host A, IP router 204 checks whether a valid routing voucher defined for the targeted end-host B, or a representation thereof, is included in the packet. If no such routing voucher defined for the targeted end-host B is indicated in the packet, router 204 will discard the packet, thereby stopping the packet from being routed further. Since the voucher of the target end-host B is present in the packet in this case, the packet can be admitted for further routing.

The router 204 thus determines the next hop for the packet, e.g. by means of a conventional forwarding table in the manner described above, and sends the packet accordingly to the next router in the transmission path in a last shown step 2:8. The forwarding operation per se may be executed in any suitable manner, which is however outside the scope of this invention. It should be understood that the above procedure of receiving the packet, checking for valid routing voucher and if admitted, forwarding the packet to the next node or otherwise discarding the packet, is repeated at any router in the transmission path having this function and the above routing voucher condition implemented for packet admission.

If a representation of the voucher is supplied to end-host A instead of the voucher itself in step 2:6, A can simply include it in any packet towards B assuming that the routers in the transmission path can derive the actual voucher therefrom in a predetermined manner. Thus, in one possible implementation, a router may receive a voucher representation in the distribution step 2:3, and the packet received in step 2:7 may include another voucher representation. If the router can derive the same valid routing voucher from both the distributed voucher representation and the one included in the received packet, that packet can be admitted and forwarded to the next hop node.

The above solution can be utilized also for adding security for the data packet, such that the routing voucher supplied to end-host A in step 2:5 actually contains two parts: 1) a first part for admission through the network in the manner described above, and 2) a second part containing an encryption key known to end-host B that end-host A uses for security processing of data in the packet. End-host B can then decrypt the packet when received, although decryption is not necessary in the intermediate network 200. In that case, it is only necessary to attach the first voucher part to the packet for admission.

Figure 3:
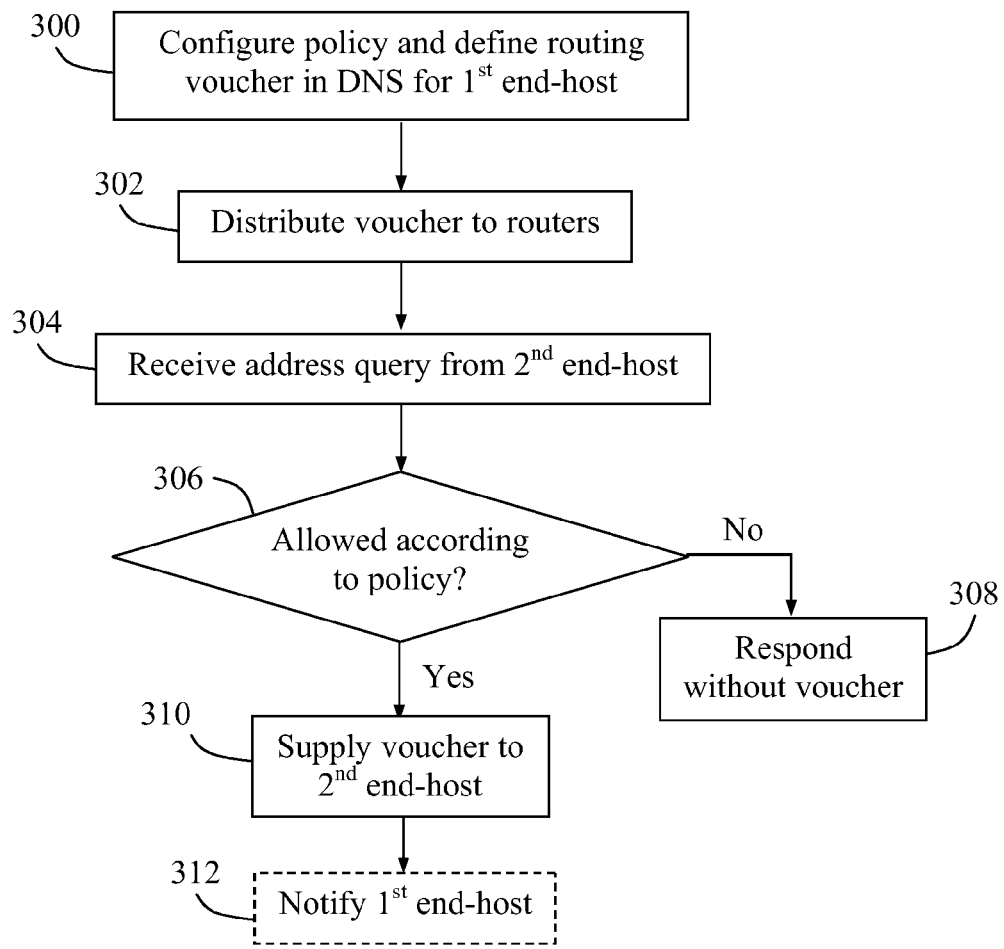
FIG. 3 is a flow chart with steps in a procedure, performed by a DNS system, for controlling the routing of data packets in an IP network, according to another embodiment.

FIG. 3 is a flow chart with steps in an exemplary procedure for controlling the routing of data packets in an IP network, as executed by a DNS system, e.g. the DNS system 200 in FIG. 2. In a first step 300, a policy for packet admission is configured for a first end-host in the DNS system, dictating which end-hosts are allowed to convey data packets to the first end-host. The policy configuring may be initiated by the first end-host or by the network operator, or a predefined policy may be configured for the first end-host automatically by default, as mentioned above. A routing voucher is also defined and maintained in the DNS system for the first end-host. As mentioned above, multiple routing vouchers may be defined for a certain end-host, e.g. to be supplied to different querying end-hosts.

In a next step 302, the routing voucher, or a representation thereof, is distributed to routers in the IP network, e.g. as in step 2:3 above. In this step, the routing voucher could also be fetched by the routers as mentioned above. It may not be necessary to distribute the voucher to all routers in a domain, depending on the router topology. Then, at some point, an address query for the first end-host is received from a second end-host, in a step 304.

It is then checked in a following step 306 whether the packet admission policy above allows the second end-host to convey data packets to the first end-host. If not, the DNS system basically refrains from supplying the routing voucher to the second end-host, in a step 308. In this step, a suitable response can be sent to the second end-host without a valid routing voucher required for routing, thereby disabling the second end-host to get across data packets to the first end-host. This response can be arranged in various different ways. For example, the response in step 308 may simply reject the address query, or indicate that packet transmission is not allowed, and it may or may not include the requested IP address of the first end-host. According to further options, the policy may dictate that a response is sent, saying basically "no packets can be received right now, but try again in X minutes", or similar.

On the other hand, if the policy allows for packet transmission from the second end-host to the first end-host, routing voucher of the first end-host, or a representation thereof, and possibly also his/her destination address are supplied in a response to the second end-host, in a step 310. The response may also comprise an instruction to include the voucher or voucher representation in any data packet sent to the first end-host.

The second end-host can then send data packets to the first end-host including the voucher or voucher representation, which will be admitted and forwarded by the routers in the transmission path, as described above. A further optional step 312 indicates that the DNS system may notify the first end-host that the second end-host has been allowed to convey data packets by means of the supplied IP address and routing voucher. The DNS system may also send the voucher to the first end-host to enable safe two-way communication or generally packets in the opposite direction as well. The voucher is thus shared and can be used by both end-hosts to get across data packets to each other. Alternatively, the DNS system may send another associated voucher to the first end-host for inclusion in any packets to the second end-host. In this case, the shared voucher or pair of associated vouchers may also be used by routers in a transmission path between two end-hosts to assure symmetric routing, i.e. that packets traverse the same set of routers in both directions, if desired.

Figure 4:
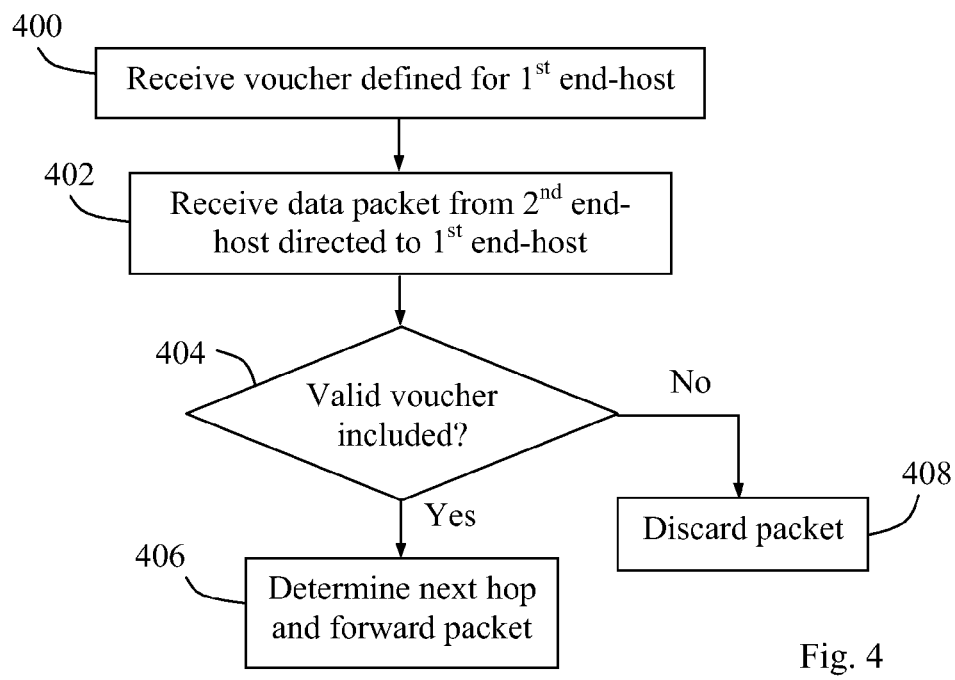
FIG. 4 is a flow chart with steps in a procedure, performed by a router, for controlling the routing of data packets in an IP network, according to another embodiment.

FIG. 4 is a flow chart with steps in an exemplary procedure for controlling the routing of data packets in an IP network, as executed by an IP router in the IP network, e.g. the router 204 in FIG. 2. In a first step 400, a routing voucher defined for a first end-host, or a representation thereof, is received. The routing voucher or voucher representation may be received from a DNS system having configured a packet admission policy for the first end-host, or from another router in a voucher propagation procedure, as described above. The router may also fetch the routing voucher from the DNS system or other voucher handling entity. The received routing voucher or voucher representation may then be stored in a list of such vouchers or voucher representations in the IP router. At some point later, a data packet directed to the first end-host is received from a sending second end-host, in a next step 402. The packet may have been forwarded from a previous router or other node in a transmission path between the second and first end-hosts.

It is then determined in a next step 404 whether a routing voucher defined and valid for first end-host, or a corresponding voucher representation, is included in the packet or not. If a valid voucher or voucher representation is included, the next hop in the transmission path is determined, e.g. by means of a forwarding table, and the packet is forwarded accordingly, in a further step 406. On the other hand, if no such valid routing voucher or voucher representation is included in the received data packet in step 404, the packet is discarded in a last shown step 408.

Figure 5:
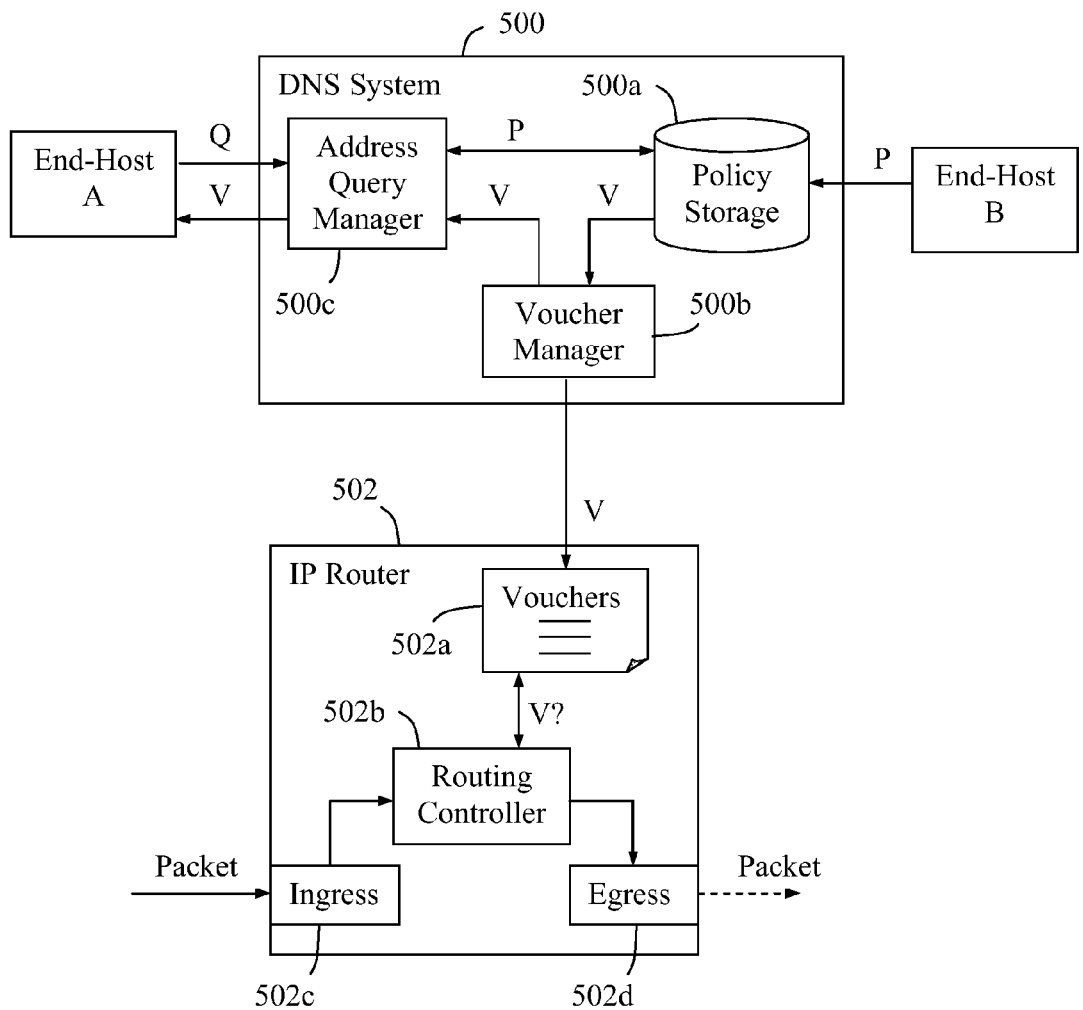
FIG. 5 is a schematic block diagram illustrating a DNS system and a router in more detail, according to further embodiments.

FIG. 5 is an exemplary logic block diagram illustrating in more detail a DNS system 500 and a router 502 present in an IP network, in accordance with further possible embodiments. The DNS system 500 is generally configured to supply destination addresses or other useful routing information to querying end-hosts in a more or less conventional manner. In addition, DNS system 500 is also adapted to supply routing vouchers according to the above-described routing voucher solution.

DNS system 500 comprises a policy storage 500*a* adapted to configure and hold packet admission policies for end-hosts, such as a policy P initiated by an end-host B shown in the figure or by an operator, or generic default policies that can be applied for some end-hosts depending on the implementation. DNS system 500 further comprises a voucher manager 500*b* adapted to maintain routing vouchers defined for associated packet admission policies and end-hosts, and to distribute or generally provide the vouchers or representations thereof to routers in the IP network. The routing vouchers may be actually defined by voucher manager 500*b* or policy storage 500*a*, depending on the implementation.

DNS system 500 also comprises an address query manager 500*c* adapted to receive address queries from end-hosts, in particular an address query Q from an end-host A regarding a target end-host B. Address query manager 500*c* is further adapted to check the packet admission policy P of end-host B to determine whether host A is allowed to send packets to host B or not. Address query manager 500*c* will thus supply a routing voucher V, which has been defined for the target end-host B, or a voucher representation in the manner described above, to end-host A in response to the query, if host A is allowed to send packets to host B according to the checked policy P. In that case, address query manager 500*c* will fetch the routing voucher V from voucher manager 500*b*. Address query manager 500*c* also supplies a destination address of the target end-host B or other routing information that implies the destination which can be used for routing data packets, to end-host A, either as a separate piece of information or embedded in the routing voucher in a suitable manner.

The router 502 comprises a voucher storage 502*a* that holds a list of routing vouchers valid for different end-users having a packet admission policy P configured in the DNS system 500. The routing vouchers in the storage 502*a* or representations thereof may have been distributed or fetched from voucher manager 500*b*. The router 502 also comprises a routing controller 502*b* adapted to determine whether data packets received at an ingress part 502*c* can be admitted for routing over an egress part 502*d* towards their destinations depending on the presence or absence of a valid routing voucher or voucher representation according to the voucher list in storage 502*a*.

When receiving a data packet directed to a target end-host, routing controller 502*b* is thus adapted to detect the presence of a routing voucher or voucher representation and to check in the voucher storage 502a if it is valid for the target end-host. More specifically, if a routing voucher or voucher representation is found in the packet, routing controller 502b will check whether that routing voucher is also present in the storage 502a and that it also corresponds to the targeted end-host, before admitting the packet for further routing. Otherwise, the packet will be discarded. The next hop may be determined in a conventional manner by means of a forwarding table, as described above. The routing controller 502b may be implemented in a forwarding unit or the like.

It should be noted that FIG. 5 merely illustrates various functional units in a logical sense, while the skilled person is free to implement these functions in practice using any suitable software and hardware means. Thus, the present invention is generally not limited to the shown structure of the DNS system 500 and the router 502.

The above-described solution can also be applied in the concept of IMS (IP Multimedia Subsystem) as follows. IMS services are generally controlled by means of SIP (Session Initiation Protocol) messaging, as is well-known in the art. The IMS-system comprises various gateways having different functions, e.g. equipment for transcoding and conferences. If such gateways are attached to a public IP-network, they could be subject to Denial-of-service attacks that might degrade the overall service quality. However, such attacks can easily be avoided to improve the quality of the network, by requiring a valid routing voucher in the manner described above also for IMS service requests, in order to admit the requests.

A routing voucher associated with the IMS gateways is initially unknown to any service requesting end-hosts, and a valid routing voucher must therefore be obtained from the DNS system in order to consume IMS services, depending on a corresponding packet admission policy. This means that no-one can reach or access the IMS service infra-structure unless approval is received from the services.

When a SIP-request is received from an end-host at a SIP-session control server referred to as "CSCF" (Call Session Control Function), and if a gateway is required in a payload transmission path, a query is sent to the DNS system to obtain a routing voucher valid for the gateway. The routing voucher is then encapsulated into the DNS-reply which is sent to the end-host. The query can be sent to the DNS system by either the end-host or the SIP-server. To ensure that no non-authorized end-host obtains the DNS reply, the SIP-server can be made responsible for placing the query to DNS.

After receiving the DNS-reply, the voucher will thus be known to the service requesting end-host. The packet admission policy may have rules dictating certain limiting conditions, e.g. allowing only a certain packet rate or amount, or limiting the voucher to only one session, to avoid any subsequent misuse of the voucher by that end-host. The voucher may also have a limited validity period and may change according to a predetermined scheme, such that a new voucher must be obtained after the previous one has expired. This will also reduce any excessive misuse of the voucher.

By implementing the present invention according to any of the above-described embodiments in the infrastructure of public IP networks such as the Internet, a packet admission policy can be configured for an end-host in an existing DNS system to control which other end-hosts are allowed to convey data packets. Thereby, the routing of data packets from potentially illicit or corrupt end-users can be prevented by means of that policy. Further, it is also an advantage that the existing DNS system is utilised for enforcing such policies in the described manner, as it is a well-established system for generally providing destination addresses (or IP addresses) of targeted end-hosts to querying end-hosts.

Some examples of rules in a packet admission policy for an associated end-host may include:

Setting a limitation on the maximum number of simultaneously supplied routing vouchers to a specific querying end-host.

Setting a limitation on the rate of address queries. If the destination address of an end-host is queried too frequently, such a rate limitation can be used to avoid Denial-of-service attacks.

Denying an end-host to obtain a routing voucher dependent on the definition of user-groups, e.g. a closed user group in the case of a VPN. End-hosts outside the user group should not obtain a routing voucher.

Applying different rules or parameters in the packet admission policy depending on the time of day, week or season.

Dictating a forwarding priority for any data packets containing the routing voucher, which will be enforced in the routers when forwarding the packets.

Requiring deposition of currency before supplying a routing voucher to an end-host to admit communication. The deposited amount may then be retained if the communication is deemed harmful in some way for the receiving end-host.

An end-host may also admit packets from any other end-host provided that the sending end-host can be traced, e.g. by requiring authentication at the DNS system. The routing voucher may further have a limited validity and be changed or updated according to a predetermined scheme, in order to limit any excessive misuse of the voucher when supplied to a querying end-host. The predetermined scheme for changing or updating the voucher may comprise any of: at certain fixed or varying time intervals, after a certain number of address queries e.g. at each address query, or in dependence of the identity of the second end-host.

The present invention provides a mechanism in the IP infrastructure for controlling the routing of data packets to prevent that packets from potentially illicit or corrupt end-users are routed in the network. This mechanism can thus be used to avoid flooding, spamming, virus, fraud, DoS attacks and generally unsolicited traffic.

While the invention has been described with reference to specific exemplary embodiments, the description is generally only intended to illustrate the inventive concept and should not be taken as limiting the scope of the invention. The present invention is defined by the appended claims.

The invention claimed is:

1. A method implemented by a Domain Name Server (DNS) system for controlling the routing of data packets in an IP network, the method comprising:

storing a packet admission policy in the DNS system, the packet admission policy configured for a first end-host and that dictates conditions for allowing or not allowing other end-hosts to convey data packets to the first end-host;

the DNS system defining a routing voucher for the first end-host corresponding to the packet admission policy, the routing voucher or a representation of the routing voucher being required in data packets directed to the first end-host for routing said data packets towards the first end-host;

the DNS system distributing said routing voucher or the representation of the routing voucher to at least one router in the IP network;

the DNS system receiving an address query for the first end-host from a second end-host;

the DNS system supplying the routing voucher or the representation of the routing voucher to the second end-host if the packet admission policy allows the second end-host to convey data packets to the first end-host, the second end-host then being able to add the routing voucher or the representation of the routing voucher to any data packets directed to the first end-host for admission through the IP network; and the DNS system refraining from supplying the routing voucher or the representation of the routing voucher to the second end-host if the packet admission policy does not allow the second end-host to convey data packets to the first end-host;

wherein the DNS system is distinct from the at least one router in the IP network.

2. A method according to claim 1, wherein the packet admission policy dictates one or more of:
which of said other end-hosts are allowed to convey data packets to the first end-host;
which of said other end-hosts are not allowed to convey data packets to the first end-host;
when data packets are admitted to the first end-host; and
that only at least one of a limited amount, rate, and size of data packets is admitted to the first end-host.

3. A method according to claim 1, wherein the routing voucher expires, is changed, or is updated according to a predetermined scheme at certain fixed or varying time intervals, after a certain number of address queries, or in dependence on the identity of the second end-host.

4. A method according to claim 1, wherein the routing voucher comprises a first part for admission through the IP network and a second part containing an encryption key, known to the first end-host, that the second end-host uses for security processing of data in the packet.

5. A method according to claim 1, wherein the routing voucher is further associated with one or more Internet Protocol Multimedia Subsystem (IMS) gateways in an IMS network, and the routing voucher is required in requests for IMS services.

6. An apparatus in a DNS system for controlling the routing of data packets in an IP network, the apparatus comprising:
a policy storage of the DNS system configured to store a packet admission policy configured for a first end-host, said policy dictating conditions for allowing or not allowing other end-hosts to convey data packets to the first end-host;
a voucher manager of the DNS system configured to:
define a routing voucher for the first end-host corresponding to the packet admission policy, the routing voucher or a representation of the routing voucher being required in data packets directed to the first end-host for routing said data packets towards the first end-host;
distribute said routing voucher or the representation of the routing voucher to at least one router in the IP network;
an address query manager of the DNS system configured to receive an address query for the first end-host from a second end-host, configured to supply the routing voucher or the representation of the routing voucher to the second end-host if the packet admission policy allows the second end-host to convey data packets to the first end-host, the second end-host then being able to add the routing voucher or the representation of the routing voucher to any data packets directed to the first end-host for admission through the IP network, and further configured to refrain from supplying the routing voucher or the representation of the routing voucher to the second end-host if the packet admission policy does not allow the second end-host to convey data packets to the first end-host;

wherein the DNS system is distinct from the routers in the IP network.

7. An apparatus according to claim 6, wherein the packet admission policy dictates any of: which end-hosts are allowed to convey data packets to the first end-host, which end-hosts are not allowed to convey data packets to the first end-host, when data packets are admitted to the first end-host, and that only at least one of a limited amount, rate and size of data packets is admitted to the first end-host.

8. An apparatus according to claim 6, wherein the packet admission policy comprises any of the following:
setting a maximum number of simultaneously supplied routing vouchers or representations of routing vouchers to a specific end-host;
setting a limitation on the rate of address queries to avoid excessively frequent querying of the destination address of an end-host;
supplying the routing voucher or the representation of the routing voucher dependent on the definition of user-groups, such that end-hosts outside a user group to which the first end-host belongs do not obtain the routing voucher or the representation of the routing voucher;
applying different rules or parameters in the packet admission policy depending on the time of day, week or season;
dictating a forwarding priority for any data packets containing said routing voucher or said representation of the routing voucher; and
requiring deposition of currency before supplying any routing voucher or representation of the routing voucher to an end-host.

9. An apparatus according to claim 6, wherein the routing voucher expires, is changed, or is updated according to a predetermined scheme at certain fixed or varying time intervals, after a certain number of address queries, or in dependence of the identity of the second end-host.

10. An apparatus according to claim 6, wherein the address query manager is further configured to provide an instruction to the second end-host to include the routing voucher or the representation of the routing voucher whenever sending a data packet to the first end-host.

11. An apparatus according to claim 6, wherein the routing voucher comprises a first part for admission through the IP network and a second part containing an encryption key, known to the first end-host, that the second end-host uses for security processing of data in the packet.

12. An apparatus according to claim 6, wherein the apparatus is configured to notify the first end-host that the second end-host has been allowed to convey data packets by receiving the routing voucher or the representation of the routing voucher.

13. An apparatus according to claim 12, wherein the apparatus is further configured to send the routing voucher or another associated routing voucher to the first end-host to enable admission of data packets in the opposite direction to the second end-host.

14. An apparatus according to claim 6, wherein the routing voucher is further associated with one or more Internet Protocol Multimedia Subsystem (IMS) gateways in an IMS network, and the routing voucher is required in requests for IMS services.

15. A method implemented by a router in an IP network for controlling the routing of data packets in the IP network, the method comprising:
 the router maintaining a voucher list including a received routing voucher or a received representation of the routing voucher that:
  is defined for a first end-host;
  is required in data packets directed to the first end-host in order to route said data packets in the IP network;
  corresponds to a packet admission policy, said packet admission policy configured in a DNS system for the first end-host and dictating conditions for allowing or not allowing other end-hosts to convey data packets to the first end-host;
 the router receiving a data packet from a second end-host that is directed to the first end-host;
 the router determining whether the received data packet contains a routing voucher or a representation of the routing voucher that can be verified by checking the voucher list;
 the router forwarding the received data packet towards its destination if the data packet contains the routing voucher or the representation of the routing voucher; and
 the router discarding the data packet if the data packet does not contain the routing voucher or the representation of the routing voucher;
 wherein the router is distinct from the DNS system.

16. A method according to claim 15, wherein the routing voucher or the representation of the routing voucher has been obtained from the DNS system or from another router in a voucher propagation procedure.

17. An apparatus in a router for controlling the routing of data packets in an IP network, the apparatus comprising:
 a voucher storage of the router configured to store a voucher list, the voucher list including a received routing voucher or a received representation of the routing voucher that:
  is defined for a first end-host;
  is required in data packets directed to the first end-host in order to route said data packets in the IP network;
  corresponds to a packet admission policy, the packet admission policy configured in a DNS system for the first end-host and dictating conditions for allowing or not allowing other end-hosts to convey data packets to the first end-host;
 an ingress part of the router for receiving a data packet from a second end-host that is directed to the first end-host;
 a routing controller of the router configured to determine whether the received data packet contains a routing voucher or a representation of the routing voucher that can be verified by checking the voucher list, to forward the received data packet towards its destination if the received data packet contains the routing voucher or the representation of the routing voucher, and to discard the data packet if the data packet does not contain the routing voucher or the representation of the routing voucher; and
 an egress part of the router for sending the data packet towards its destination if forwarded by the routing controller;
 wherein the router is distinct from the DNS system.

18. An apparatus according to claim 17, wherein the voucher storage is further configured to obtain the routing voucher or the representation of the routing voucher from the DNS system or from another router in a voucher propagation procedure.

19. An apparatus according to claim 17, wherein the apparatus is configured to determine the next hop using a forwarding table, if the data packet is forwarded by the routing controller.

* * * * *